April 20, 1926.

D. D. PAXTON 1,581,471

COMBINED PACKING AND BEARING MEANS

Filed Dec. 5, 1921

WITNESS
F. R. Gardner

INVENTOR
D. D. PAXTON.
BY
Joseph B. Gardner
his ATTORNEY

Patented Apr. 20, 1926.

1,581,471

UNITED STATES PATENT OFFICE.

DONALDSON D. PAXTON, OF OAKLAND, CALIFORNIA.

COMBINED PACKING AND BEARING MEANS.

Application filed December 5, 1921. Serial No. 520,100.

*To all whom it may concern:*

Be it known that I, DONALDSON D. PAXTON, a citizen of the United States, and a resident of Oakland, county of Alameda, and State of California, have invented a new and useful Combined Packing and Bearing Means, of which the following is a specification.

My invention relates to a packing and bearing structure for use in connection with a sealed chamber through which extends a rotating shaft.

An object of the invention is to provide a structure of the character described in which a minimum longitudinal movement of the packing gland is required in the repacking operation, and which at the same time affords an efficient bearing for the shaft within the gland.

Another object of the invention is to provide the gland with a replaceable bearing for the shaft.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings.

Briefly expressed the packing and bearing means of my invention as here shown comprises a gland formed of transversely separable sections which are adapted for threaded engagement with a hub and which enclose a bearing which presents a continuous annular surface for the shaft which extends through said hub. Means are also provided on the sections for preventing the longitudinal and rotative displacement of the bearing with respect thereto.

Figure 1:
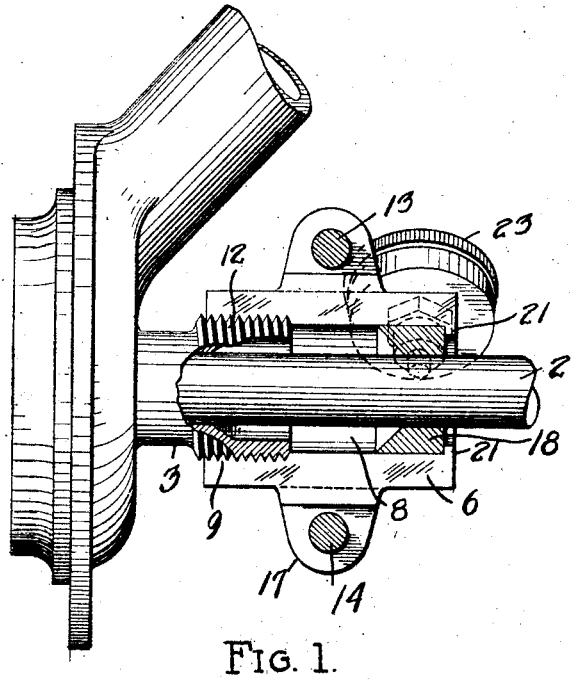
Figure 1 is a longitudinal sectional view showing the packing and bearing means of my invention operatively disposed on a hub and shaft.
Figure 2:
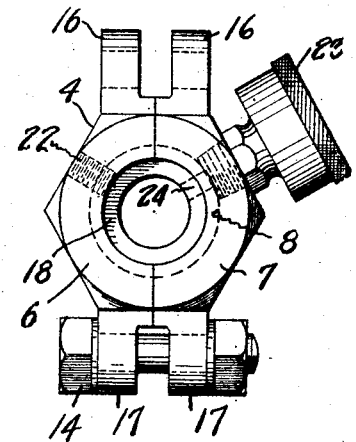
Figure 2 is an end view of the means.

A detailed description follows:

As illustrated in Figure 1 the means of my invention is arranged about a shaft 2 which is rotatably mounted in the hub 3 of the wall of a sealed chamber. In the preferred embodiment the means comprises a gland 4 which is preferably formed of two like sections 6 and 7 provided with semicircular cavities which in the assembled position of the sections define a central bore 8. The inner end 9 of the cavities is screw-threaded so as to enable the gland to be readily attached to the similarly threaded portion 12 of said hub. The sections are adapted to be releasably held together by means of bolts 13 and 14 which engage in the bosses 16 and 17 formed on the sections.

Arranged within the bore of the gland adjacent the outer end thereof is a bearing member 18 having an outside diameter substantially equal to the bore of the gland and provided in turn with a bore 19 whose diameter is such that the shaft 2 may rotate freely therein. The bearing 18 is held against outward longitudinal displacement in the gland bore by means of shoulders 21 formed at the outer end of each of the sections. The bearing also functions as the part of the gland adapted for pressing the packing medium against the hub, and for this purpose the inner end of the bearing is beveled so as to cause the packing medium to be forced inward radially against the shaft. A set-screw 22 extending through one of the sections engages the bearing and prevents the rotation thereof with respect to the gland. The portion of the shaft 2 engaging in the bearing is preferably lubricated by means of the grease-cup 23 which is fixed to the gland and communicates with the bore of the bearing through the passage 24.

When it is desired to repack the structure, it is merely necessary to withdraw the bolts 13 and 14 and disassemble the sections. The new packing may then be wrapped around the portion of the shaft between the hub 3 and bearing 18, the latter being retained on the shaft. As soon as the necessary amount of packing has been wrapped, the sections are assembled about the shaft, bearing, and hub, and secured together by the bolts. Upon now giving the gland a slight turn so that the threaded portion thereof will cause the gland and bearing to advance toward the hub, the packing will be forced in tight engagement with shaft and an effective seal thus produced.

It will now be understood that with the means of my invention a maximum amount of packing may be disposed about the shaft longitudinally thereof without necessitating a large longitudinal displacement of the gland during the repacking operation, or sacrificing the annular continuity afforded the bearing surface for the shaft by the use of the usual one-piece gland. Furthermore due to the fact that the bearing and gland are separable, the former which wears first, may be readily replaced rather than the entire gland.

Figure 3:
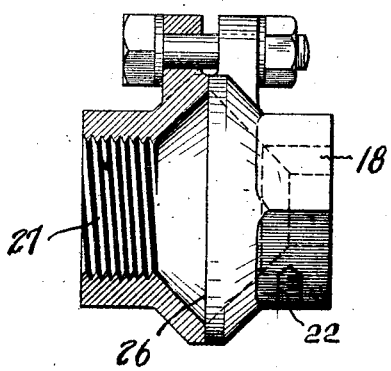
Figure 3 is a half section and side elevation of a modified form of the structure.
Figure 4:
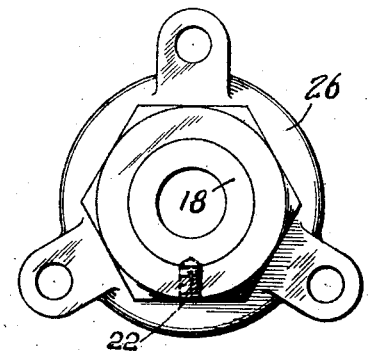
Figure 4 is an end view of the structure shown in Figure 3.

In Figures 3 and 4 the construction of the gland is somewhat modified. In this embodiment the gland 26 is formed of a pair of longitudinally separable rather than transversely separable sections, one of the sections being provided with a threaded portion 27 for engagement with the hub, whereas the other contains the bearing 18.

I claim:

1. In a combined packing and bearing means for a rotatable shaft, a separable pair of segmental gland sections arranged to contain the packing for said shaft and provided with screw-threads for engagement with a hub through which said shaft is arranged to extend and against which one end of said packing is adapted to abut, means for securing said sections together, a bearing for said shaft presenting an uninterrupted annular surface therefor and adapted to be positioned within said sections at the other end of said bearing, means on each of said sections for retaining said bearing against longitudinal displacement, and means on one of said sections for preventing the rotative movement of said bearing with said shaft.

2. In a combined packing and bearing means for a rotatable shaft, a separable pair of segmental sections arranged to contain within the bore thereof a packing medium for said shaft and provided at one end with a screw-threaded portion for engagement with a similarly threaded portion of an extraneous member through which said shaft is arranged to extend and against which one end of said packing is adapted to abut, means for securing said sections together in assembled position, a bearing for said shaft presenting uninterrupted annular surface therefor and adapted to be positioned within the bore of said sections adjacent the other end thereof, a shoulder formed on both of said sections adapted to engage the outer end of said bearing, the inner end of said bearing being arranged to abut against the other end of said packing and being beveled so as to enable it to exert a radially-inward pressure against the packing, and means on one of said sections for holding said bearing against rotation with said shaft.

In testimony whereof, I have hereunto set my hand at Oakland, Calif., this 25th day of November.

DONALDSON D. PAXTON.